May 5, 1925.
O. E. WINTER
AUTOMATIC STEERING SYSTEM FOR SHIPS
Filed July 7, 1922
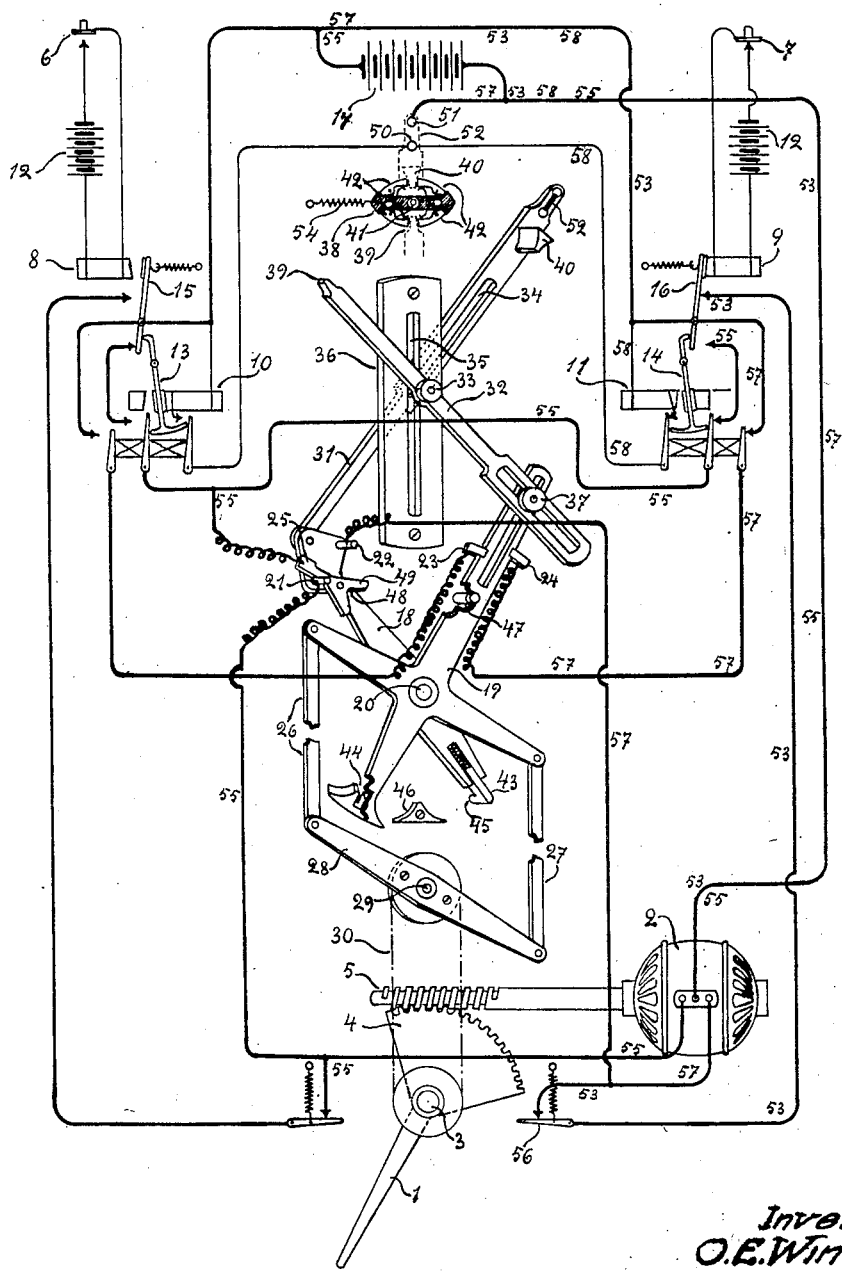
Inventor
O.E.Winter
By Marks Clerk
Attys Patented May 5, 1925.

1,536,996

UNITED STATES PATENT OFFICE.

OSKAR EDVIN WINTER, OF STOCKHOLM, SWEDEN, ASSIGNOR OF ONE-HALF TO KNUT STEINMETZ, OF LONDON, ENGLAND.

AUTOMATIC STEERING SYSTEM FOR SHIPS.

Application filed July 7, 1922. Serial No. 573,430.

*To all whom it may concern:*

Be it known that OSKAR EDVIN WINTER, a subject of the King of Sweden, residing at 1B Varvsgatan, Stockholm, Sweden, has invented certain new and useful Improvements in Automatic Steering Systems for Ships, of which the following is a specification.

This invention refers to steering arrangements for ships and, more particularly, to means for automatically stabilizing the course upon a change of the course. Principally, the invention consists in the provision under the control of the rudder or the rudder gearing of a regulating device for the steering machine operating to automatically "steady" the ship after its having been directed into a new course or back to the original course. The said steadying effect is attained in the same way as in manual steering by turning the rudder back through the normal middle position into an opposite position, thereby opposing the tendency of the ship to pass out of the course owing to its inertia. After this return movement over the middle position, the rudder is automatically reset to and stopped in its middle position.

The invention further comprises constructional features of the regulating device of the steering machine which will be hereinafter more fully described. In the accompanying drawing the figure is a diagrammatic representation of an embodiment of the invention wherein the steering machine is controlled electrically.

The rudder 1 is adapted to be shifted by means of an electrical steering motor 2 coupled to the rudder-stock 3 through a worm 4 and gear segment 5. The circuits of the motor 2 are arranged to be controlled manually for steering purpose by means of two push-button or otherwise constructed switches 6, 7, the switch 6 being used for shifting the rudder to starboard and the switch 7 for shifting the rudder to port. By the operation of the switches 6, 7 the rudder is only shifted to one or the other side, whereas the return movement of the rudder is effected automatically upon the release of the switch 6 or 7 respectively by means of the above-mentioned regulating device, which in the example shown comprises a rudder-operated lever mechanism and two pairs of relays 8, 9 and 10, 11. The relays 8, 9 are controlled directly by the switches 6, 7, which are inserted one in each relay circuit together with a common feeble-current battery 12. The relays 10, 11 are of the polarized type and their armatures 13, 14 are arranged to be operated also mechanically by the corresponding armatures 15, 16 of the relays 8, 9. The relays 10, 11 as well the steering motor 2 are supplied with current from a power current battery 17.

The lever mechanism comprises two control or switching members 18, 19 pivotally mounted on a shaft 20 and provided with insulated contacts 21, 22, 23, 24, 25 connected to the various circuits. The switching member 19 is positively connected to the rudder-stock 3 by means of links 26, 27 and a lever 28 secured to a shaft 29 which is coupled to the rudder-stock by means of a chain 30. The switching members 18, 19 could also be directly mounted on the rudder-stock 3 or, alternatively, the lever 28 could be provided on the rudder-stock, but the arrangement shown or any other similar transmission arrangement is to be preferred in order that the switching mechanism may be placed more conveniently at the desired place on the ship. The switching member 18, which is loosely mounted on the shaft 20, is connected with the member 19 by means of two links 31, 32, which are coupled together by means of a pin 33 engaging a slot 34 in the link 31 and guided in another slot 35 provided in a fixed plate 36. The ends of the link 32 and the member 19 are slotted and pivotally connected by means of a screw-bolt 37, whereby the length of the lever arms can be varied for the purpose of varying the angular displacement of the member 18, as explained below.

The switching mechanism is shown in a position brought about by the closure of the switch 7. When the rudder is in its normal middle position the levers 18, 19, 31, 32 extend in the same direction and the mechanism is locked by a locking device 38 engaging the end 39 of the link 32 and a stud 40 on the link 31. Said locking device consists of a plate or disk rotatable on a pin 41 and provided with four spring-actuated detents 42, between which the links 31, 32 are kept. There is another locking device provided at the opposite ends of the switching members 18, 19, which, however, is inoperative in the normal position of the mechanism. The locking device last mentioned consists of a spring-actuated slidable detent 43 adapted to engage a notch 44 in the end of the member 19. When the switching members are returned to the normal position, the detent 43 is moved out of operative position by a projecting pin 45 on the detent 43 sliding on a fixed cam 46.

In the normal position of the switching mechanism the contact 21 is connected with the contact 23 and the contact 22 with the contact 24. The contact 25 then takes up an idle middle position and is kept in this position by a pin 47 on the member 19 engaging a notch 48 of the contact carrying piece 49. Further, two contacts 50, 51 in the circuits of the relays 10, 11 are connected with one another in the normal position by a contact piece 52 provided at the outer end of the link 31.

When the switch 7 is operated for the purpose of shifting the rudder to port, the relay 9 is first energized. The armature 16, upon being attracted, closes a circuit 53 through the motor 2, which then operates to shift the rudder. The switching member 19 will thereby be turned to the right and by the action of the link 32, the locking device 38 will also be turned to the right against the action of a spring 54. Then again the end of the link 31 is moved to the right, whereby the switching member 18 is given an initial movement to the left. This movement is then continued, according as the switching member 19 is moving to the right, by the pin 33 engaging the end of the slot 34 while sliding in the slot 35. The member 18 will thus be angularly displaced in a direction opposite to the displacement of the member 19, and the amount of movement will, evidently, be in proportion to the angular displacement of the rudder. By the movement of the members 18 and 19 the contact 25 is switched over into contact with the contact 21 by the pin 47 actuating the switch member 49, whereby a return circuit 55 for the motor 2 is prepared. The turning of the rudder continues, as long as the switch 7 remains closed. In case the rudder should reach its outermost position before the switch 7 is opened, the circuit 53 will be opened in that position by the rudder sector 4 operating a contact lever 56. When the ship enters the new course wanted, the switch 7 is opened. The relay 9 then de-energizes and opens the circuit 53 at the same time closing the return circuit 55. The movement of the rudder is thereby reversed and, as a consequence, the switching member 19 is now moved to the left leaving the member 18 in a position corresponding to the angular position to which the rudder was shifted, owing to the pin 33 now running freely in the slot 34. The rudder thus passes through its middle position and continues its movement to the opposite side thereby stabilizing the course while exerting a steadying effect on the ship. When the switching member 19 reaches the angular position of the member 18, the switch 49 is operated so as to open the return circuit 55. At the same time a resetting circuit 57 is closed through the contacts 22, 24, whereby the rudder is moved back into its normal middle position. The switching member 18, being now clutched to the member 19 by the locking device 43, 44, will then be carried by the member 19 into the normal position, in which a circuit 58 is closed through the relay 11 over the contacts 50, 51, whereby the armature 14 is returned to its original position and the resetting circuit 57 is opened. The rudder is thus stopped in its middle position. By operating the switch 6 a similar switching operation is started under the control of the relay 8 and 10, only that the switching member 19 is now moved to the left and the member 18 to the right.

As seen from the above description, the amount of the return movement of the rudder beyond the middle position is determined by the angular displacement of the switching member 18 and, consequently, said movement can be varied by providing a variable motion transmission device between the members 18 and 19. In the example shown in the drawing said device is represented by the link mechanism 31, 32, in which the ratio of transmission may be varied by an adjustment of the connection between the member 19 and the link 32 by means of the screw-bolt 37.

In automatic steering systems such as for instance that described in the specification of my patent application Serial No. 563,831, the switches 6, 7 may be replaced by the two selenium cells which are arranged in such systems under the control of the compass needle so as to energize either relay 8 or 9 upon a deviation to one or the other side thereby causing the ship to resume its course. The course will then, evidently, be stabilized automatically exactly in the same way as above described, as the selenium cell will be made inactive as soon as the ship resumes its original course. A definitive change of the course may be effected in such a system by displacing the selenium cells angularly relatively to the compass needle, as described in said specification.

It should be observed that the invention is not limited to an electric control of the steering machine, as such control may be effected also mechanically, particularly when the steering machine is a steam engine or a hydraulic engine, in which case the switching members 18, 19 co-operate to govern the controlling valve of the engine. The control may also be partly electrical and partly mechanical.

What I claim is:

1. A control system for stabilizing the course of a ship upon a change of the course comprising a steering machine, means for causing the steering machine to shift the rudder to one or the other side, means for causing a return movement of the rudder beyond its middle position before it is finally restored to the middle position, and means under the control of the rudder for limiting said return movement in proportion to the shifting angle of the rudder.

2. A control system for stabilizing the course of a ship upon a change of the course comprising a steering machine, means for causing the steering machine to shift the rudder to one or the other side, means for causing a return movement of the rudder, beyond its middle position, a control member for limiting said return movement adapted to be displaced by the rudder upon the rudder being shifted and means for causing the rudder to be automatically restored to its middle position upon reaching the limit position.

3. A control system as claimed in claim 2, comprising transmission means between the rudder and the control member to cause a displacement of the control member that is proportionate to the shifting angle of the rudder.

4. A control system as claimed in claim 2, comprising means for causing the control member to be automatically restored to the middle position of the rudder together with the rudder.

5. A control system for stabilizing the course of a ship comprising a steering machine, means for causing the steering machine to shift the rudder to one or the other side, means for causing a return movement of the rudder beyond its middle position, a control member for limiting said return movement, a transmission device operated by the rudder to cause a displacement of the control member that is proportionate to the shifting angle of the rudder, means for causing the rudder to be automatically restored to its middle position upon reaching the limit position, and means for causing the control member to be automatically restored to the middle position of the rudder.

6. A control system as claimed in claim 5 comprising coupling means for temporarily connecting the control member with the rudder.

7. A control system as claimed in claim 5, comprising means for stopping the rudder and the control member in the middle position of the rudder.

8. A control system for stabilizing the course of a ship comprising a steering machine, means for causing the steering machine to shift the rudder to one or the other side, means for causing a return movement of the rudder beyond its middle position, a control member for limiting said return movement, a transmission device operated by the rudder to displace said control member in a direction opposite to the movement of the rudder, means for making said transmission device inoperative during the return movement of the rudder, means for causing the rudder to be automatically restored to its middle position upon reaching the limit position, means for coupling the rudder with the control member upon reaching the limit position so as to cause the control member to be restored together with the rudder.

9. A control system is claimed in claim 8 in which the transmission device is adjustable so as to permit a change of the ratio between the shifting movement and the return movement of the rudder.

10. A control system as claimed in claim 8 comprising means for automatically disconnecting the control member from the rudder upon reaching the middle position of the rudder.

11. A control system as claimed in claim 8 in which the transmission device consists of a link mechanism connecting the control member with the rudder.

12. A control system for stabilizing the course of a ship comprising an electrically controlled steering machine, electrical steering means for causing the steering machine to shift the rudder to one or the other side, means for causing a return movement of the rudder beyond its middle position, a control member for limiting said return movement, a transmission device operated by the rudder to cause a displacement of said control member proportionate to the shifting angle of the rudder, and switching means adapted to be operated by the cooperation of the rudder and the control member so as to cause the rudder to be automatically restored to its middle position upon reaching the limit position.

In testimony whereof I affix my signature in presence of two witnesses.

OSKAR EDVIN WINTER.

Witnesses:
 OSCAR GRAHN,
 INEZ IVERSON.